United States Patent [19]

Greminger, Jr. et al.

[11] 3,719,651

[45] March 6, 1973

[54] HYDROXYBUTYLMETHYLCELLULOSE AS A PROTECTIVE COLLOID IN VINYL MONOMER POLYMERIZATION

[75] Inventors: George K. Greminger, Jr.; Ronald L. Glomski, both of Midland, Mich.

[73] Assignee: The Dow Chemical Company, Midland, Mich.

[22] Filed: Feb. 1, 1971

[21] Appl. No.: 111,630

[52] U.S. Cl. ........260/92.8 W, 260/85.5 N, 260/85.7, 260/87.5 R, 260/87.7, 260/88.7 F, 260/89.1, 260/91.7
[51] Int. Cl. .................................................C08f 3/30
[58] Field of Search ................................260/92.8 W

[56] References Cited

UNITED STATES PATENTS

| | | | |
|---|---|---|---|
| 2,968,651 | 1/1961 | Friedrich | 260/92.8 W |
| 3,042,665 | 7/1962 | Jankowiak et al. | 260/92.8 W |
| 3,592,800 | 7/1971 | Oschmann | 260/92.8 W |

Primary Examiner—Harry Wong, Jr.
Attorney—Griswold & Burdick, Ronald G. Brookens and Albin R. Lindstrom

[57] ABSTRACT

An improvement in the process for preparing polymers from substantially water-insoluble polymerizable ethylenically unsaturated monomer in aqueous suspension wherein such monomers form polymers which are insoluble in their monomer, said improvement comprising the use of hydroxybutyl-methylcellulose as the protective colloid in the water-phase of an oil-in-water suspension system.

3 Claims, No Drawings

HYDROXYBUTYLMETHYLCELLULOSE AS A PROTECTIVE COLLOID IN VINYL MONOMER POLYMERIZATION

BACKGROUND OF THE INVENTION

It is known that substantially water-insoluble monoethylenically unsaturated monomer, such as vinyl chloride, can be polymerized in aqueous suspension in the presence of a number of natural and synthetic water-soluble polymers which function as protective colloids in the polymerization process to provide products of desirably uniform particle size distribution. Exemplary of such prior known protective colloids or dispersing agents are the hydroxypropylmethylcellulose materials as described in U.S. Pat. No. 2,538,051, as well as the methylcelluloses, polyvinylalcohol and gelatin. These polymers, due to their surface activity in water are capable of dispersing and stabilizing water immiscible monomers in water and may be classified as weak polymeric surfactants. Like a surfactant, they function by lowering the interfacial tension between monomer and water, thereby permitting the stabilized monomer to polymerize in a distinct size distribution.

When polymerization recipes and procedures result in excessive foaming problems in the reactor, a shift to the use of higher surface tension can be helpful in alleviating the problem. However, when a product such as hydroxyethylcellulose with a high surface tension is used to achieve this, control of the reaction becomes more difficult and the resulting particles are hard, non-porous glassy beads with unacceptable plasticizer absorption. In contrast, the use of hydroxybutylmethylcellulose with essentially similar surface tension values avoids foaming problems and yields a resin with excellent absorption properties (See Table No. 1 infra). Further, as is true for cellulosic protective colloids, when insufficient hydroxypropylmethylcellulose is used as a protective colloid in suspension polymerization of vinyl chloride, the particle size distribution shifts to coarser fractions and the plasticizer absorption becomes poorer. It was surprising to find that when a shift to coarse material was observed with hydroxybutylmethylcellulose, the loss of plasticizer absorption was not observed. This property of hydroxybutylmethylcellulose will allow a wider choice of particle size distribution without loss of plasticizer absorption properties, and will reduce sensitivity to variables of normal plant operations (See Table II, infra).

It is, therefore, a primary object of this invention to provide a cellulosic protective colloid which displays the desirable combination of adequate surfactant properties without undesirable foaming, thus permitting the exclusion of antifoaming materials, along with allowing a wider choice of particle size distribution without loss of desirable plasticizer absorption properties.

SUMMARY OF THE INVENTION

The above and related objects are obtained by utilizing as a protective colloid, in the non-emulsified aqueous phase of the suspension polymerization of substantially water-insoluble monoethylenically unsaturated monomeric materials, from abut 0.05 to 5 percent, based on monomer weight of a water-soluble hydroxybutylmethylcellulose ether having from about 17 to 33 weight percent methoxyl content and from 2 to 13 weight percent hydroxybutyl content.

DESCRIPTION OF THE PREFERRED EMBODIMENTS

The hydroxybutylmethylcellulose ethers used in the process of the present invention are prepared by reaction between an alkali cellulose having an alkali (NaOH) to cellulose ratio, by weight, of from 0.7 to 1.5 and a water to cellulose ratio in about the same range, i.e., the alkali metal hydroxide solution used in making the alkali cellulose may be one of from 30 to 60 percent strength, but is preferably in the range from 45 to 55 percent strength, by weight. The alkali cellulose is mixed with from 0.15 to 0.8 part by weight of butylene oxide per part of cellulose and the mixture is caused to react. Preferred reaction temperatures are not greatly in excess of 40°C. Thereafter, the product of this reaction is heated with from 1.1 to 2.0 parts by weight of methyl chloride per part of cellulose at a temperature of at least 40°C., preferably not about 80°C., until etherification is substantially complete. The etherifying agents may both be present at the start of the reaction, or the etherification may be effected at the lower temperature in the absence of methyl chloride, and the latter reagent may then be added when most of the olefin oxide has reacted.

These products have considerable thermoplasticity, melting at least 10°C. and as much as 40°C. or more below their decomposition temperatures when tested on a melting point bar. In addition, the ethers are water-soluble and are also soluble in a range of aqueous methanol solvents.

As described herein, the prescribed hydroxybutylmethylcellulose ethers are particularly effective as protective colloids or dispersing agents, for the polymerization of any substantially water-insoluble monoethylenically unsaturated monomer such as vinyl chloride. Exemplary of other such monomeric materials are the vinylidene halides such as vinylidene chloride; vinyl alkanoates such as vinyl acetate, vinyl proprionate and the like and acrylonitrile and methacrylonitrile, and mixtures thereof.

Obtainment of desired polymer particle size may be realized utilizing the prescribed cellulose ethers in a concentration ranging generally from about 0.1 to 5 percent based on the weight of monomer.

The choice of viscosity will depend upon the system employed. For polymerization of vinyl chloride and vinyl chloride copolymers with monomers such as vinylacetate, a range of products with viscosities from about 5 to 50 cps. at 2 percent concentration and 20°C. is preferred. Polymers and copolymers of vinylidene chloride require somewhat higher viscosity products, e.g. from about 400 to 4,000 cps.

Further, as in usual aqueous suspension polymerization reactions of the type contemplated herein, the polymerization proceeds in the presence of a polymerization catalyst. In this regard, the catalyst isopropyl percarbonate has been found to be particularly effective.

The following examples further illustrate the present invention and its advantages. Unless otherwise specified all parts and percentages are by weight.

EXAMPLE

In each of the series of individual experiments a 2 gallon glass lined reactor fitted with a glass crow-foot agitator, a stainless steel finger baffle and a pressure release valve was first purged with nitrogen. Thereafter 3,540 grams of demineralized water, and 3.54 grams of surface active agent (representing a 0.2 percent solution of the hereafter identified cellulosic material in water and 2.5 grams of a 20 percent solution of the catalyst isopropyl percarbonate in xylene was added. A partial vacuum was then created in the reactor and 1,770 grams of vinyl chloride added with agitation at 225 RPM for 5 minutes. The reactor temperature was brought to 54°C. At ten pound pressure decrease from maximum pressure, the reaction was placed on full cooling and vented to zero pounds pressure, then evacuated to twenty inches of mercury.

The polymerized vinyl chloride was removed from the reactor, washed with water then filtered and dried overnight at 50°C.

The following Tables I and II identify the cellulosic materials used and describe the resulting polymer:

TABLE I

| | For Comparison Hydroxyethyl Cellulose | The Invention Hydroxy butylmethyl -cellulose[1] |
|---|---|---|
| % Based on Monomer | 0.2 | 0.2 |
| 2% visc. at 20°C (cps.) | 15 | 19 |
| Bulk Density (grams/cc) | 0.57 | 0.44 |
| Polymer Characteristics | | |
| % Plasticizer Absorption (%dioctylphthalate absorbed based on resin weight) | 64 | 99 |
| Powder Mix Time (Min.) | 60 | 5.8 |
| Surface Tension (dynes/cm.) | 63.1 | 64.1 |

[1]Methoxy—28-33%
Hydroxy butoxyl—2-6%
Moisture, maximum—3.0%
Chemical iron, maximum—150 ppm
Sodium chloride, maximum—1.0%
Particle size—95% minimum through No. 40 USS Sieve The above data illustrate that the use of hydroxybutylmethylcellulose in the suspension polymerization of vinyl chloride monomer, as a replacement for hydroxyethylcellulose, provides polymer having essentially the same surface tension values and thus avoids foaming, while providing a resin with significantly improved plasticizer absorption properties and reduced powder mix time.

TABLE II

| | For Comparison Hydroxy-Propylmethyl-cellulose (METHOCEL 65 HG) | The Invention Hydroxy-butylmethyl -cellulose[1] |
|---|---|---|
| % Based on Monomer | 0.2 | 0.2 |
| 2% Visc. at 20°C. | 50 | 19 |
| Bulk density (grams/cc) | 0.49 | 0.44 |
| Polymer Characteristics | | |
| % Plasticizer Absorption | 86 | 99 |
| Powder Mix Time (Min.) | 5 | 5.8 |
| Surface Tension (dynes/cm.) | 50.9 | 64.1 |
| Screen Analysis - U.S.S. | | |
| 70 | 8.85 | 37.8 |
| 70–100 | 89.1 | 61.3 |
| 100 | 2.1 | 1 |

[1]As per Table I

The above data indicate that the use of hydroxybutylmethylcellulose in the suspension polymerization of vinyl chloride monomer wherein a shift to coarse material is observed, unexpectedly provides significantly improved plasticizer absorption properties as compared to the use of equivalent amounts of hydroxypropylmethylcellulose.

What is claimed is:

1. In the process of polymerizing vinyl chloride monomer in non-emulsified aqueous suspension in the presence of a protective colloid the improvement consisting of:
   using as said protective colloid from about 0.05 to 5 percent, based on monomer weight of a water-soluble hydroxybutylmethylcellulose ether having from about 17 to 33 weight percent methoxyl and from about 2 to 13 weight percent hydroxybutyl.

2. The process of claim 1 wherein said hydroxybutylmethylcellulose contains from about 28 to 33 weight percent methoxyl and from about 2 to 6 weight percent hydroxybutyl.

3. The process of claim 2 wherein said hydroxybutylmethylcellulose has a viscosity of from about 5 to 100 cps at two percent concentration at 20°C. in the polymerization system.

* * * * *